United States Patent Office 3,563,673
Patented Feb. 16, 1971

3,563,673
ULTRA HIGH VACUUM DIFFUSION PUMP FLUID AND METHOD OF USING SAME
Kohei Sakuma, Chiba-ken, and Hisashi Oikawa and Syuhei Tanimori, Tokyo, and Masayasu Takao, Chiba-ken, Japan, assignors to Lion Fat & Oil Co., Ltd., Tokyo, Japan, a corporation of Japan
No Drawing. Filed Dec. 12, 1968, Ser. No. 783,435
Claims priority, application Japan, Dec. 19, 1967, 42/81,309
Int. Cl. C07c *15/24*
U.S. Cl. 417—152                                5 Claims

ABSTRACT OF THE DISCLOSURE

An ultra high vacuum diffusion pump fluid which serves to produce a desired degree of vacuum less than $10^{-9}$ torr, consists essentially of the condensation product of an olefin having twenty to twenty-four carbon atoms with naphthalene, methylnaphthalene or ethylnaphthalene.

BACKGROUND OF THE INVENTION

(1) Field of the invention

The present invention relates to an ultra high vacuum diffusion pump fluid comprising the condensation product of an olefin with naphthalene or an alkyl derivative thereof.

(2) Description of the prior art

With the rapid development of techniques used in such fields as the space industry and atomic energy applications, a big demand for ultra high vacuum diffusion pump fluids has recently been created, because such research and development are very often conducted under ultra high vacuums. Although there have hitherto been used two or three such fluids made from silicone products and polyphenyl ether products, these so-called ultra high vacuum pump fluids can attain an ultimate pressure of $10^{-8}$ torr at the most; and if any of them can achieve nearly $10^{-9}$ torr, they are so inferior in their secondary properties that they allow much more fluid to flow back into the vacuum chamber because their vapor pressure is not low enough, they show unsatisfactory thermal resistance and anti-oxidizing property, and they have a very short life. They are indeed nothing but products of trial manufacture; and yet their prices are very high.

Various types of synthetic diffusion pump fluids of hydrocarbons, esters, etc. have been known to us, and alkylnaphthalene is also known as an ordinary diffusion pump fluid; however, many of them have alkyl groups whose number of carbon atoms is around eight. The ultimate pressure which is obtained by the use of these types of fluids, even when they are made of the finest quality and after having been rectified several times, ranges between $10^{-7}$ torr and $10^{-8}$ torr at the best. The results obtained with those whose carbon atoms number between fourteen and sixteen or thereabout do not differ much from those whose carbon atoms amount to eight or thereabout. Such being the case, alkylnaphthalene has dropped out of the use as an ultra high vacuum diffusion pump fluid, and those types of fluids based on the silicones and others have come to attract due attention.

SUMMARY OF THE INVENTION

The object of the present invention is to provide an ultra high vacuum diffusion pump fluid designed to produce a desired degree of vacuum below $10^{-9}$ torr, said fluid consisting of the condensate of olefin with naphthalene or its alkyl derivatives.

After intensive and patient researches with the purpose of obtaining an ultra high vacuum diffusion pump fluid of superior quality, we have achieved the present invention by making the startling discovery that the condensate obtained from the reaction of an olefin having twenty to twenty-four carbon atoms with naphthalene, or methylnaphthalene, or ethylnaphthalene, can work as a diffusion pump fluid to produce an ultra high vacuum and thereby attain an ultimate pressure of $10^{-9}$ torr. It has also been found that these condensates made from olefin and naphthalene are very satisfactory not only in attaining the ultimate pressure, but also in minimizing the quantity of the fluid flowing back to the vacuum chamber, and furthermore they have excellent thermal resistance and anti-oxidizing property. More particularly, an ultra high vacuum pump fluid prepared according to this invention is a condensate of an olefin with naphthalene, methylnaphthalene, or ethylnaphthalene; and the respective long-chained alkyl parts in these condensates mainly consist of those whose number of carbon atoms ranges between twenty and twenty-four. The long-chained alkyl parts of these condensates may contain carbon atoms whose number is outside of said range; however, the more said long-chained carbon atoms whose number is within the aforementioned range are contained in the condensates, the more excellent are the properties of these condensates, when used as an ultra high vacuum pump fluid.

The condensation products of olefin and naphthalene related to the present invention are manufactured, for instance, as mentioned below; however, this invention is not intended to be limited by the details set forth in the examples. A mixture of olefin and naphthalene which is present slightly in excess is condensed in the presence of a catalyst of active clay at ordinary pressure and an elevated temperature. After the condensate is subjected to filtration and rectification, alkylnaphthalene having the desired number of carbon atoms is selected from the condensates, thus providing the condensates of olefin and naphthalene employed in the present invention.

As typical olefins to be used in this invention, the following compounds may be mentioned:

Straight-chained olefins (including α-olefin and inner olefin) such as n-1-eicosene, n-1-heneicosene, n-1-docosene, n-1-tricosene, n-1-tetracosene, n-2-eicosene, n-2-heneicosene, n-2-docosene, n-2-tricosene, n-2-tetracosene, n-3-eicosene, n-3-heneicosene, n-3-docosene, n-3-tricosene, 6-3-tetracosene, n-4-eicosene, n-4-heneicosene, n-4-docosene, n-4-tricosene, n-4-tetracosene, n-5-eicosene, n-5-heneicosene, n-5-docosene, n-5-tricosene, n-5-tetracosene, n-6-eicosene, n-6-heneicosene, n-6-docosene, n-6-tricosene, n-6-tetracosene, n-7-eicosene, n-7-heneicosene, n-7-docosene, n-7-tricosene, n-7-tetracosene, n-8-eicosene, n-8-heneicosene, n-8-docosene, n-8-tricosene, n-8-tetracosene, n-9-eicosene, n-9-heneicosene, n-9-docosene, n-9-tricosene, and n-9-tetracosene; branch-chained olefins (including α-olefin and inner olefin) such as 2,4,4,6,6,8,8,10,10 - nonamethyl-1-undecene, 2,4,4,6,6,8,8,10,10,12,12-undecamethyl-1-tridecene, 4,6,8,10,12,14 - hexamethyl-1-pentadecene, and 4,6,8,10,12,14,16-heptamethyl-2-heptadecene; and mixtures of the compounds mentioned above.

PREFERRED EMBODIMENTS OF THE INVENTION

Evaluation tests were conducted with the following ultra high vacuum diffusion pump fluids, respectively:

(A) A condensate of n-1-eicosene (olefin having 20 carbon atoms) and naphthalene (as per present invention)
(B) A condensate of n-1-docosene (olefin having 22 carbon atoms) and naphthalene (as per present invention)
(C) A condensate of n-1-tetracosene (olefin having 24 carbon atoms) and methylnaphthalene (as per present invention)

(D) A condensate of n-1-octadecene (olefin having 18 carbon atoms) and naphthalene (all the following fluids are evaluated for control purpose)
(E) A condensate of n-1-hexacosene (olefin having 26 carbon atoms) and naphthalene
(F) Hexadecyl naphthalene
(G) Dioctyl sebacate ester
(H) Commercially obtainable DC-705 of silicone product manufactured by Dow Corning Co.
(I) Commercially obtainable Convalex-10 of polyphenyl ether product manufactured by C. V. C.
(J) Commercially obtainable OS-124 of polyphenyl ether product manufactured by Monsanto.

The results obtained in the tests were as follows:

| Pump fluid: | Attained pressure, torr | Back flow of fluid, cm.$^2$ | Thermal and oxidation resistance, change in color |
|---|---|---|---|
| A | $3.2 \times 10^{-9}$ | $5.7 \times 10^{-3}$ | No change. |
| B | $2.8 \times 10^{-9}$ | $2.2 \times 10^{-3}$ | Do. |
| C | $4.8 \times 10^{-9}$ | $3.6 \times 10^{-3}$ | Do. |
| D | $7.5 \times 10^{-7}$ | $4.1 \times 10^{-2}$ | Do. |
| E | $6.2 \times 10^{-7}$ | $2.9 \times 10^{-2}$ | Do. |
| F | $4.2 \times 10^{-7}$ | $3.8 \times 10^{-2}$ | Colored remarkably. |
| G | $3.8 \times 10^{-7}$ | $5.7 \times 10^{-2}$ | Do. |
| H | $9.3 \times 10^{-9}$ | $5.5 \times 10^{-3}$ | No change. |
| I | $1.2 \times 10^{-8}$ | $6.3 \times 10^{-3}$ | Colored. |
| J | $2.0 \times 10^{-8}$ | $6.9 \times 10^{-3}$ | Do. |

The methods of testing the respective fluids were as follows:

Attained pressure: Measurements were made of the pressures produced by the use of the two diffusion pumps arranged in series connection, one being a 6-inch fractional distillation type diffusion pump (model DO-503 manufactured by Leybold-Heraeus G.m.b.H., West Germany, exhausting velocity 600 l./sec., heating electric power 1.2 kw. (220 v.), operated with approximately 250 cc. of fluid) used as a principal diffusion pump, and the other being a 2½-inch fractional distillation type diffusion pump (model DO-121 manufactured by Leybold-Heraeus G.m.b.H., exhausting velocity 130 l./sec., heating electric power 0.32 kw. (220 v.), operated with approximately 40 cc. of fluid) used as an auxiliary diffusion pump.

Back flow of fluid: A fluid collector was installed in the ultra high vacuum chamber (or the tested area) and the quantity of the fluid caught in the collector was measured while the fluid was flowing into the collector stationarily.

Thermal and oxidation resistance: While the diffusion pumps were being operated, coloring of each fluid was examined after the fluid had been exposed to the atmospheric air which was introduced into its presence for ten minutes by the operation of the valve (the procedure was repeated four times).

What we claim is:

1. In the method of producing in a system a vacuum of less than about $10^{-9}$ torr, using an ultra high vacuum diffusion pump in which an organic diffusion pump fluid is circulated to cause diffusion of gas from the system into the circulating organic diffusion pump fluid, the improvement comprising operating the vacuum diffusion pump using as the organic diffusion pump fluid the condensation product of (A) an olefin having from twenty to twenty-four carbon atoms with (B) a material selected from the group consisting of naphthalene, methylnaphthalene and ethylnaphthalene.

2. Improvement according to claim 1 wherein said olefin contains straight-chained olefin.

3. Improvement according to claim 1 wherein said olefin contains α-olefin.

4. Improvement according to claim 1 wherein said olefin contains inner olefin.

5. Improvement according to claim 1 wherein said olefin contains straight-chained α-olefin.

References Cited

UNITED STATES PATENTS

| 3,034,700 | 5/1962 | Hickman | 230—101 |
| 3,069,069 | 12/1962 | Fischer | 230—101 |
| 3,458,117 | 7/1969 | Munch et al. | 230—101 |

OTHER REFERENCES

Egloff: Physical Constants of Hydrocarbons, vol. IV, pp. 114 and 115, Reinhold Pub. Corp., New York (1947).

CURTIS R. DAVIS, Primary Examiner

U.S. Cl. X.R.

260—668; 417—55